(12) United States Patent
Albornoz et al.

(10) Patent No.: US 7,254,593 B2
(45) Date of Patent: Aug. 7, 2007

(54) SYSTEM AND METHOD FOR TRACKING ANNOTATIONS OF DATA SOURCES

(75) Inventors: Jordi Albornoz, Arlington, MA (US); Lee Feigenbaum, Brookline, MA (US); Kyle Lane Henderson, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/759,965

(22) Filed: Jan. 16, 2004

(65) Prior Publication Data

US 2005/0165852 A1 Jul. 28, 2005

(51) Int. Cl.
*G06F 17/30* (2006.01)

(52) U.S. Cl. .................. 707/203; 707/102; 707/104.1; 715/511; 715/512

(58) Field of Classification Search .................... 707/5, 707/10, 100, 102, 104.1, 203; 709/206; 715/511, 512; 345/810
See application file for complete search history.

(56) References Cited

U.S. PATENT DOCUMENTS

| | | | |
|---|---|---|---|
| 4,809,170 A | 2/1989 | Leblang et al. | |
| 4,912,637 A | 3/1990 | Sheedy et al. | |
| 5,146,552 A | 9/1992 | Cassorla et al. | |
| 5,375,237 A * | 12/1994 | Tanaka et al. | 707/102 |
| 5,574,898 A | 11/1996 | Leblang et al. | |
| 5,581,682 A | 12/1996 | Anderson et al. | |
| 5,581,755 A | 12/1996 | Koerber et al. | |
| 5,706,510 A | 1/1998 | Burgoon | |
| 6,551,357 B1 | 4/2003 | Madduri | |
| 6,799,298 B2 * | 9/2004 | deVries et al. | 715/512 |
| 6,917,965 B2 * | 7/2005 | Gupta et al. | 709/206 |
| 7,016,919 B2 * | 3/2006 | Cotton et al. | 707/104.1 |
| 7,047,259 B1 * | 5/2006 | Chasman et al. | 707/203 |
| 7,051,275 B2 * | 5/2006 | Gupta et al. | 715/512 |

(Continued)

FOREIGN PATENT DOCUMENTS

WO WO146854 A1 6/2001

OTHER PUBLICATIONS

"Electronic Posted Notes," IBM Technical Disclosure Bulletin, vol. 37, No. 1, Jan. 1994.

(Continued)

*Primary Examiner*—Shahid Al Alam
(74) *Attorney, Agent, or Firm*—John E. Campbell; Stephen Bongini; Fleit Kain Gibbons Gutman Bongini & Bianco P.L.

(57) ABSTRACT

Systems, methods and computer program products are provided for creating a new annotation for a data source, and for carrying forward annotations to a data source when the data source is modified. According to the method for creating a new annotation, a data source version identifier is generated based on a current version of the data source, and text of the annotation is received. A new annotation record is added to an annotation data store, with the new annotation record including the data source version identifier that was generated and the text of the annotation. In one embodiment, the new annotation record further includes point information indicating coordinates of at least one part of the current version of the data source that the annotation is meant to annotate.

13 Claims, 4 Drawing Sheets

U.S. PATENT DOCUMENTS

| | | | |
|---|---|---|---|
| 7,111,009 B1 * | 9/2006 | Gupta et al. | 707/102 |
| 7,143,091 B2 * | 11/2006 | Charnock et al. | 707/5 |
| 7,155,453 B2 * | 12/2006 | Kincaid | 707/104.1 |
| 2004/0189713 A1 * | 9/2004 | Thames et al. | 345/810 |
| 2004/0199516 A1 * | 10/2004 | Thames et al. | 707/100 |

OTHER PUBLICATIONS

"Non-Destructive Annotation of Documents in an Image Processing Environment," #430191, IBM Research Disclosure, Feb. 2000.

* cited by examiner

SYSTEM AND METHOD FOR TRACKING ANNOTATIONS OF DATA SOURCES

BACKGROUND OF THE INVENTION

1. Field of the Invention

This invention relates to annotating data sources, and more specifically to a system and method for generating and tracking annotations of data sources.

2. Description of Related Art

Today, electronic documents are used to enhance information availability and dissemination to a wide audience of viewers. Frequently, one of these viewers may desire to make comments regarding the content of the electronic document and store these comments for future reference. For instance, someone reading a research paper online may wish to make comments about the accuracy of the conclusions reached in that paper. This may be accomplished by annotating the research paper through the use of an annotation system. In general, annotation is the act of adding metadata (i.e., a resource that provides information about another resource) to a particular data source. To function properly, an annotation system must store some type of mapping (or link or association) between the data source and each annotation that annotates it.

With conventional annotation systems, the annotations are stored in a data stream together with the actual data source (or document) being annotated. For example, Microsoft Word has a "Comments" feature that stores annotations (or comments) regarding a document's contents in the Microsoft Word document itself. This method of annotation is metaphorically comparable to adding the comment (annotation) to the document by sticking a piece of paper with the note onto a physical hard copy of the document itself. The linking between each annotation and the data source in this case is trivial because the annotations are stored in the same data stream as the data being annotated.

However, if an annotator wants a colleague to see the annotations that were made to a document, the document with the annotations stored in it must be sent to the colleague. This is because the annotations are stored in the data stream of the document itself, or in other words reside with the document. If it is desired to have multiple users view and annotate a document, the document itself (which contains all annotations) must be sequentially sent to the users to allow them to sequentially make such combined annotations. This sequential transfer of the document from annotator to annotator quickly becomes impractical as the number of annotators grows. Further, storing annotations in the same data stream as a document is not feasible for any document the annotator cannot modify (e.g., a read-only document or any document that the user does not have permission to modify), such as a page on the World Wide Web (web page).

Thus, it is desirable to store annotations external to (or separately from) the data source (or document) being annotated. This provides a more powerful annotation system in which multiple users can concurrently annotate the document, and the annotations made by each annotator can be immediately reflected to all of the viewers. Additionally, separating annotation storage from the data source allows annotations to be made to web pages and other data sources that the annotators cannot directly modify.

However, a problem arises when annotations are stored separately from the underlying data source. In particular, the mapping or links between the data source and the separately stored annotations becomes complex if the data source is changed in terms of content, structure, or location (i.e., a new or edited document is created based on the original document). For example, deleting one paragraph or page of a long document causes the separately stored annotations to that document to no longer be correctly linked or mapped. Thus, all of the previous annotations linked to the original document do not point to the new document, or at least do not link correctly with the modified document. Thus, document annotating must start over from scratch so that all of the insight and effort put into the previous annotations are lost with respect to the new document, even those that are still relevant (e.g., those that do not relate to a modified portion of the document).

Accordingly, there is a need for a system and method of maintaining the linking between a data source and externally stored annotations across different versions of the data source, without requiring any of the linking information to be stored in the data source.

SUMMARY OF THE INVENTION

One aspect of the present invention is to provide a method, system, and computer program product for creating a new annotation for a data source.

Another aspect of the present invention is to provide a method, system, and computer program product for method of carrying forward annotations to a data source when the data source is modified.

One embodiment of the present invention provides a method for creating a new annotation. According to the method, a data source version identifier is generated based on a current version of the data source, and text of the annotation is received. A new annotation record is added to an annotation data store, with the new annotation record including the data source version identifier that was generated and the text of the annotation. In one embodiment, the new annotation record further includes point information indicating coordinates of at least one part of the current version of the data source that the annotation is meant to annotate.

Another embodiment of the present invention provides a method for carrying forward annotations to a data source when the data source is modified. According to the method, a first data source version identifier is generated based on a prior version of the data source, and a second data source version identifier is generated based on a modified version of the data source. The annotation data store is queried for the annotations that apply to the prior version of the data source, and a new entry is added into the annotation record of each relevant annotation that is returned by the query. The new entry in the annotation record includes the second data source version identifier and point information indicating coordinates of at least one part of the modified version of the data source that this annotation is meant to annotate.

The foregoing and other features and advantages of the present invention will be apparent from the following more detailed description of the embodiments of the invention, as illustrated in the accompanying drawings.

DETAILED DESCRIPTION OF PREFERRED EMBODIMENTS

The present invention, according to preferred embodiments, overcomes problems with the prior art by providing annotation storage systems and methods for maintaining the linking between a data source and externally stored annotations across different versions of the data source, without requiring any of the linking information to be stored in the data source. Accordingly, multiple users are provided with the ability to concurrently annotate a data source, and a user can annotate a read-only data source (e.g., a document on the web), At the same time, annotations remain properly associated with the data source across different versions (i.e., modifications) of the data source.

Further, annotations are carried forward across different versions of the data source by being linked to multiple versions of the data source, instead of just being copied from the older version to the newer version of the data source. This allows a change in an annotation to be reflected when the annotation is viewed in any version of a data source. This also allows a much smaller amount of storage to be used to externally store annotations that applied to multiple versions of a data source. Additionally, this allows searches across all annotations to yield better results because duplicate annotations are not stored and returned.

In one preferred embodiment, the annotation storage system assigns a unique data source version identifier (DataSourceVersionID) to each version of a data source, and annotations are located based on this unique identifier. In other words, each unique data source version identifier applies to a single version of the data source. Further, each annotation can be associated with one or more of the data source version identifiers, and point information is associated with each of these associated data source version identifiers. This allows the annotation to exist in multiple versions of the single data source. Whenever a new version of the data source is created (i.e., through a modification of the data source), the annotation storage system updates the linking of the external annotations for the new version of the data source, and associates these new linkings for the annotations with the data source version identifier for the new version of the data source. Thus, annotations are stored externally to a data source being annotated, yet the annotations exist (i.e., are properly linked) for all versions of a changing data source.

In general, a "data source" is any data that a user can annotate, and this data can change over time. Such a data source is typically represented within a computer system as a sequence of binary data. A "version" of a data source is a "snapshot" (or "freeze frame") of the binary data that makes up the data source at a moment in time. Thus, a "data source" is a logical grouping of binary data, even if the binary data changes over time. For example, a Microsoft Word document containing a resume is a data source. As it is modified over time with corrections, additions, deletions, and other revisions, the document is still the same data source. However, each modified document is a different version of the data source. For example, the binary data of the resume as it existed on a given day is a single version of the data source. If the resume is changed the next day, the changed resume becomes a new version of the data source, but remains the same data source. In other words, while the binary data in a data source may change over time, a specific version of the data source remains static as a particular "view" of the data source.

Figure 1:
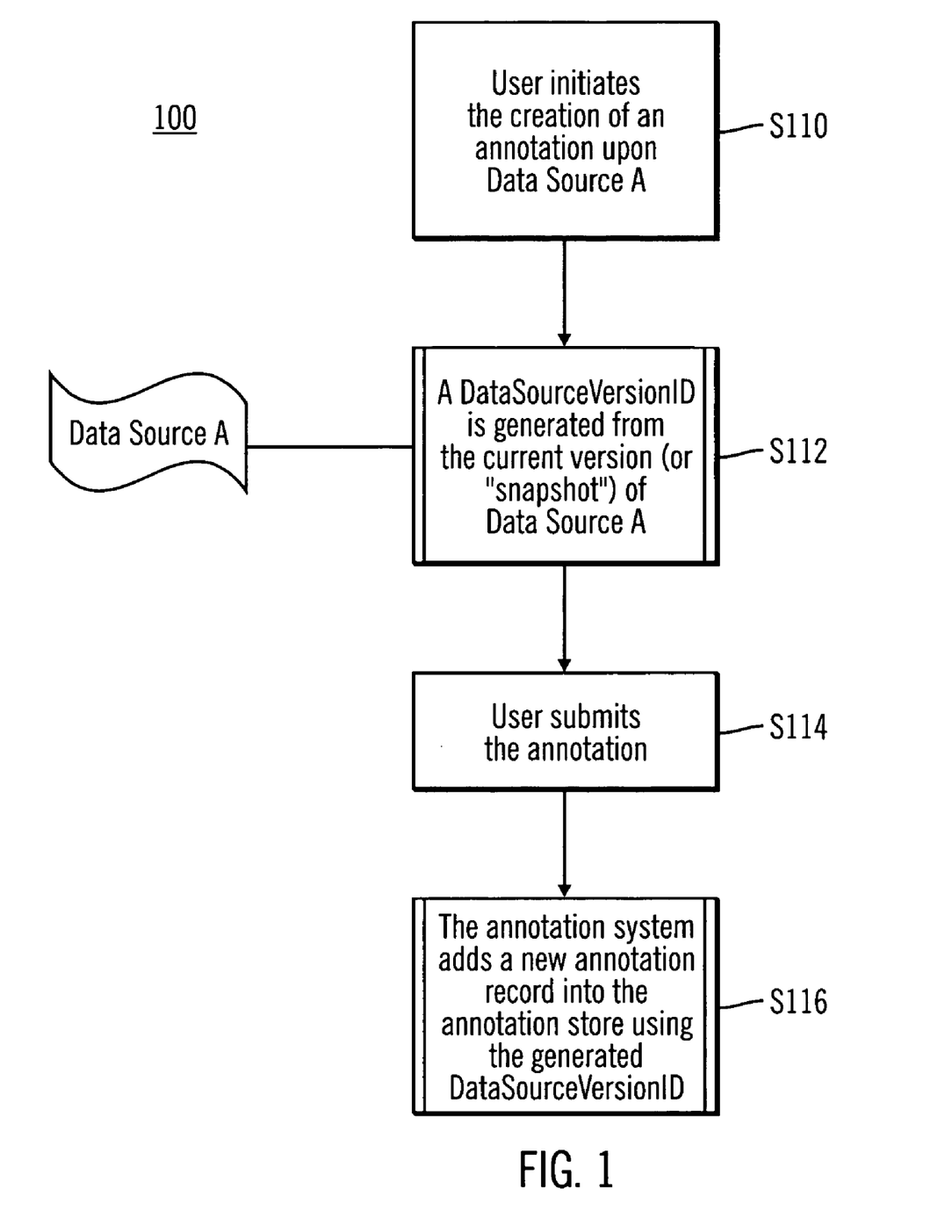
FIG. 1 is a flow chart depicting a process for creating a new annotation for a data source according to one embodiment of the present invention.

FIG. 1 illustrates a flow chart of a process 100 for creating an annotation for a data source in accordance with one embodiment of the present invention. As shown, a user first initiates the creation of an annotation upon a data source A (step S110). In response, the annotation system generates a data source version identifier DataSourceVersionID for the current version (or "snapshot" or "freeze frame") of the data source A (step S112).

Preferred embodiments of the present invention require a unique data source version identifier to be generated for each version of a data source that is to be annotated. In the embodiment of FIG. 1, a hashing algorithm, such as the MD5 hashing algorithm, is used to generate a unique identifier for a current version of a data source based on the contents of the current version of the data source. Accordingly, the data source version identifier DataSourceVersionID is the hash (e.g., MD5 hash) of the binary data of the current version of the data source. A hash value (or "hash" or "checksum") is a number or smaller string generated from a string of text based on a formula such that it is extremely unlikely that some other text string will produce the same hash value. Thus, using a hash value as the data source version identifier DataSourceVersionID provides substantial uniqueness without requiring central management of the identifier namespace. In further embodiments, any type of hash algorithm or any other process can be used to generate or create the unique identifiers for versions of data sources.

As shown in FIG. 1. the user submits the annotation (step S114), and then the annotation system adds a new annotation record into the annotation data store for the data source A (step S116). In particular, the record added to the data store includes the generated data source version identifier DataSourceVersionID, point information, and the annotation itself. The "point information" indicates coordinates that specify which part or parts of the current version of the data source A that the annotation is meant by the user to annotate (e.g., page 4, characters 5 to 16, or page 8, line 10).

Thus, the annotation system allows the user to create an annotation upon the data source, and associates the location of that annotation in the data source with a unique data source version identifier DataSourceVersionID (i.e., an identifier that applies to a single version of a data source).

An exemplary implementation of the annotation creation process of FIG. 1 will now be described. First, a user views a data source A over the Internet via a user-interface executing on the user's computer. Desiring to create an annotation upon the data source A, the user indicate in the data source A what portion of the data source A is being annotated (that is, supplies or otherwise indicates the point information) (step S110). The annotation system executing on the user's computer then reads the bytes of the selected data source as it stands at that instant in time. The system calculates the MD5 hash of these bytes to generate a data source version identifier DataSourceVersionID for the current version of data source A (step S112). The user inputs the text of the annotation to the annotation system (step 114), and the annotation system communicates with the annotation data store so as to insert (or add) a new annotation record (step 116). Exemplary annotation records are described below with reference to FIG. 3. Briefly, the new annotation record includes the annotation text and an identifier list. This list has a single entry that contains the data source version identifier DataSourceVersionID for the current version of the data source A and the point information. In this embodiment, the annotation data store is a relational database. However, in further embodiments the annotation data store can be any type of database or any sort of general storage and retrieval mechanism.

Figure 2:
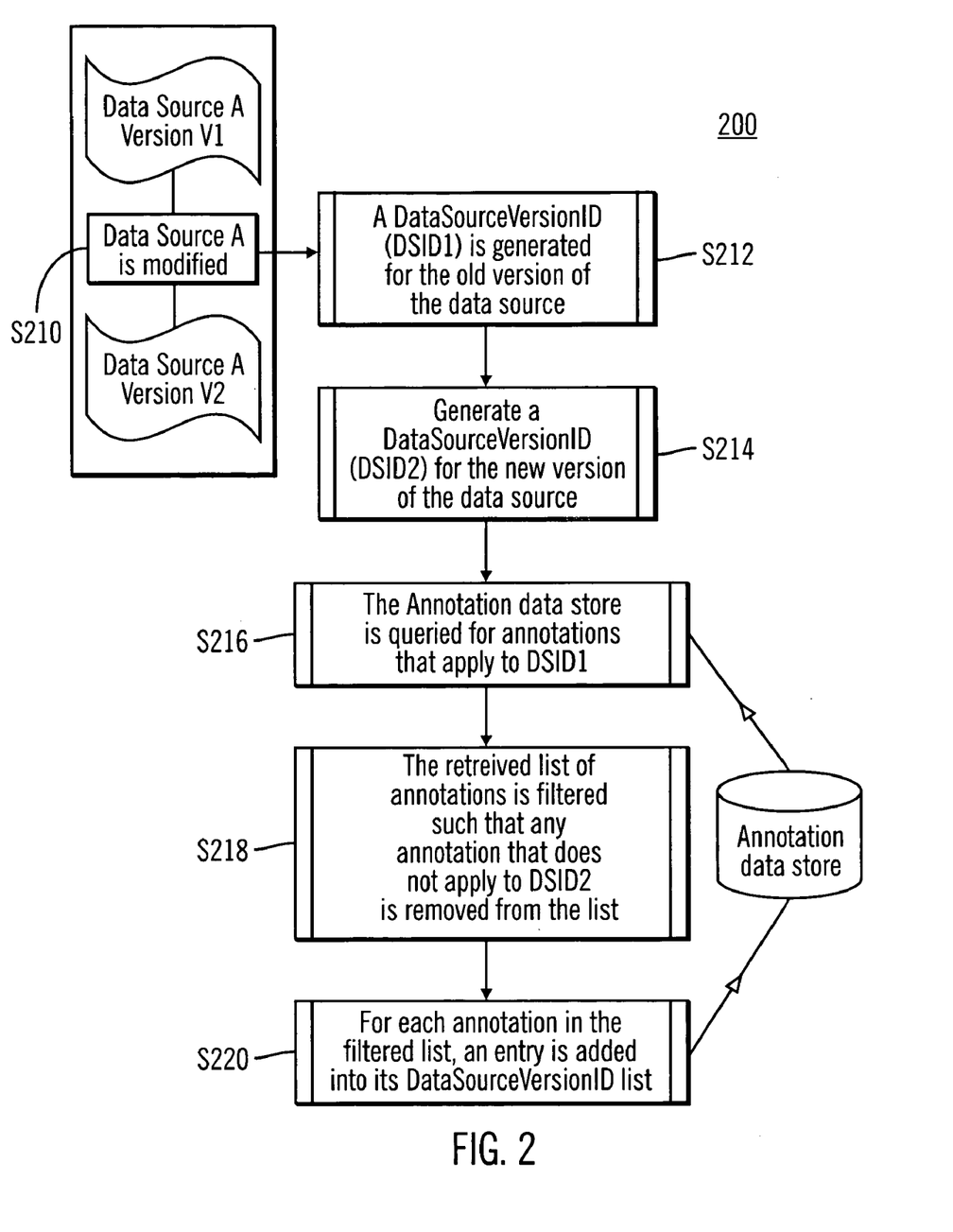
FIG. 2 is a flow chart depicting a process according to one embodiment of the present invention for carrying forward annotations when a data source is changed.

FIG. 2 illustrates a flow chart of a process 200 according to one embodiment of the present invention for carrying forward annotations when a data source is changed. First, an annotated data source A changes or is modified (step S210). In response, the old data source version identifier DSID1 for the old (or non-modified) version V1 of the data source A is generated (or retrieved or otherwise derived) (step S212), and a new data source version identifier DSID2 is generated for the new (or modified) version V2 of the data source A (step S214).

The annotation system then uses the old data source version identifier DSID1 to query the annotation data store for a list of all annotations that apply to the old version V1 of the data source A (step S216). Next, the annotation system filters the list that is returned so as to remove any annotation that is not applicable to the new version V2 of the data source A (step S218). In other words, only annotations that apply to the new version V2 of the data source A remain. This filtering may be performed in numerous ways. For example, in one embodiment, the annotations are filtered based on the point information. Thus, if the annotation's point information for the old version V1 of the data source A specifies a location that has been deleted in the new version V2 of the data source A, then that annotation is removed. In another embodiment, the modifying user is queried whether or not each annotation should be carried forward to the new version V2 of the data source A. A further embodiment uses intelligent matching to filter the list.

After the list of annotations has been filtered to remove annotations that do not apply to the new version V2 of the data source A, for each remaining annotation, the annotation system adds a new entry into the identifier list for that annotation that is stored in the annotation data store (step S220). The new entry in the annotation's identifier list contains the new data source version identifier DSID2 that was generated and point information for the annotation relative to the new version V2 of the data source A. This new (or transformed) point information may be derived in numerous ways, such as using character offset or relative point information based on text insertions and deletions, prompting the modifying user for annotation locations in the new version, or by using intelligent matching. An annotation whose point information cannot be transformed can have no point information entered into the identifier list for the new version of the data source, or can cause no new entry to be added to the identifier list for that annotation.

In the embodiment described above, the mapping of annotations to a new version of the data source is performed immediately after a data source is modified. However, in further embodiments, this remapping is performed at a later time. For example, in one embodiment, the annotation system checks a list of data sources for changes at a set interval (e.g., every night). In another embodiment, the annotation system only checks a data source for changes when a new annotation is added to that data source or when the annotations for that data source are viewed.

When a user selects to view a data source with its annotations, the annotation system generates a data source version identifier for the current version of data source (e.g., the MD5 hash). The annotation system then uses the generated data source version identifier to query the annotation data store for a list of all annotations that apply to the current version of the data source. For each annotation, the point information associated with the generated data source version identifier in the identifier list is then used to locate that annotations on the current version of the data source.

Figure 3:
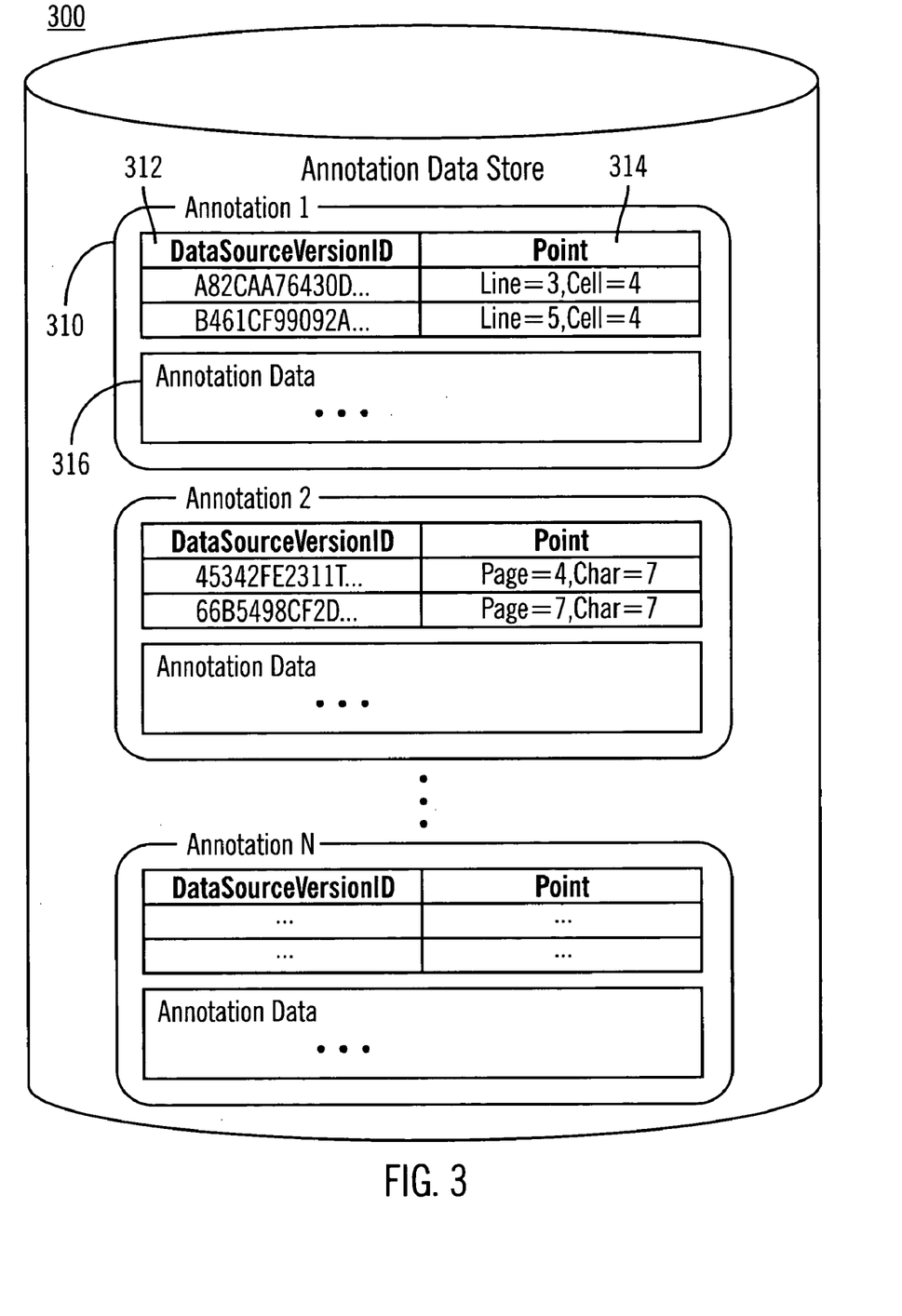
FIG. 3 is block diagram depicting an annotation data store for storing annotation information in accordance with one embodiment of the present invention.

FIG. 3 is block diagram illustrating the structure of an external data store 300 for storing annotation information in accordance with one embodiment of the present invention. Each annotation record 310 in the annotation data store 300 includes the annotation data 316 (e.g., the text entered by a user), and an identifier list. The identifier list is a table in which each record contains a data source version identifier DataSourceVersionID 312 and corresponding point information 314 relative to that data source version identifier. The identifier list for each annotation can include one or more data source version identifiers, and point information is associated with each of these data source version identifiers. Thus, each annotation can exist in multiple versions of the data source. Further, whenever the data is modified, a new record is added to the identifier list for each still-relevant annotation so as to properly link the annotation to the new version of the data source. Thus, annotations are stored in the annotation data store that is external to the data source, yet the annotations carry forward across multiple versions of the data source. Additionally, annotations are carried forward across different versions of the data source in such a way that a change in an annotation itself will reflected when the annotation is viewed in any version of the data source.

While the annotation data store 300 of this embodiment is contained in a single storage system in a single location, in further embodiments the annotation storage system is distributed across multiple storage locations and/or systems that forms a single logical storage system for annotations.

The annotation systems and methods of the present invention can be realized in hardware, software, or a combination of hardware and software. An annotation system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction In a different material form.

A computer system may include, inter alia, one or more computers and at least a computer program product on a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 4:
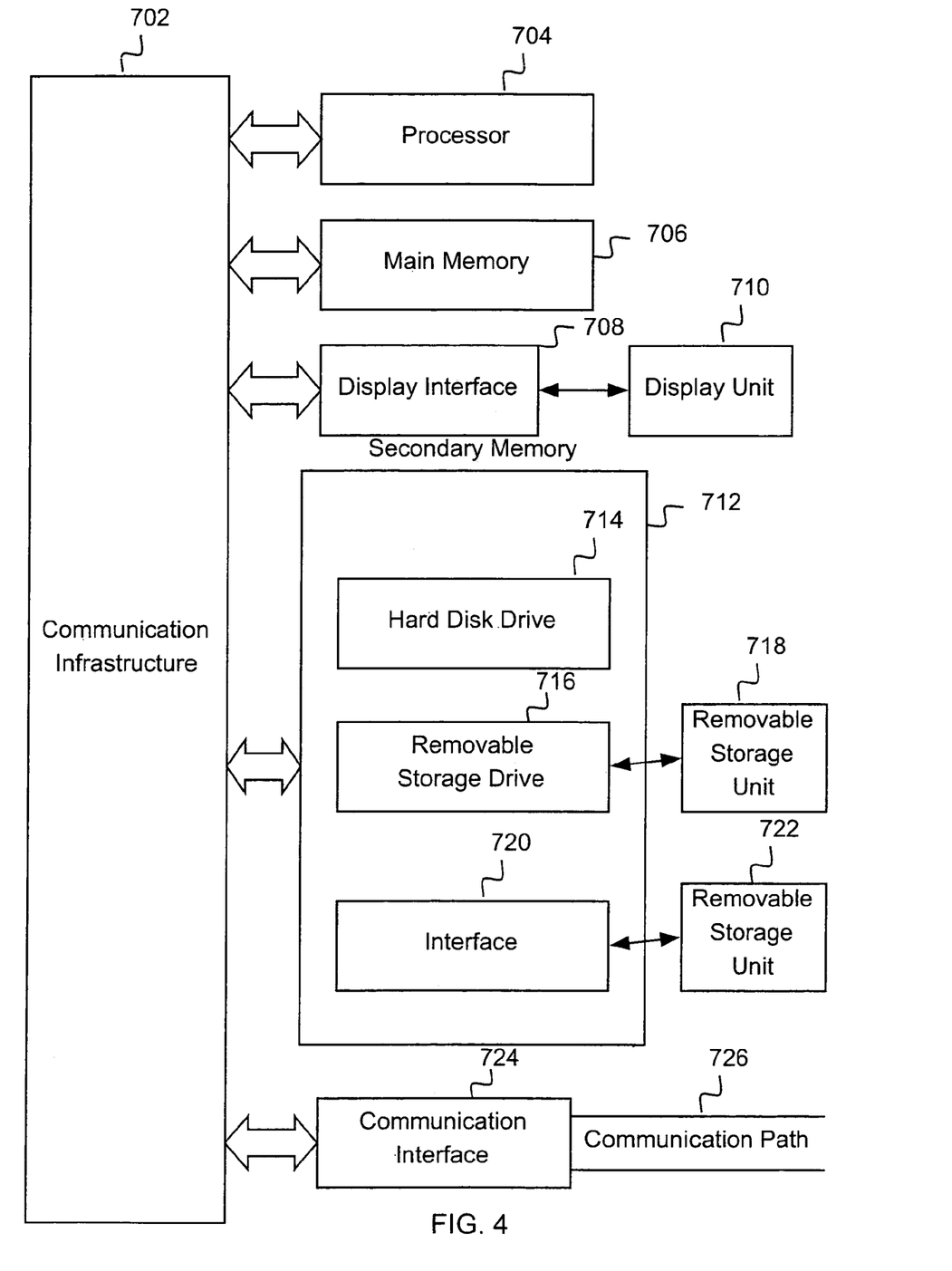
FIG. 4 is a block diagram of a computer system for implementing an embodiment of the present invention.

FIG. 4 is a block diagram of a computer system for implementing embodiments of the annotation system of the present invention, such as those described above. The computer system of FIG. 7 includes one or more processors, such as processor 704. The processor 704 is connected to a communication infrastructure 702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 708 that forwards graphics, text, and other data from the communication infrastructure 702 (or from a frame buffer not shown) for display on the display unit 710. The computer system also includes a main memory 706, preferably random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. Removable storage unit 718, represents, for example, a floppy disk, magnetic tape, optical disk, etc. which is read by and written to by removable storage drive 716. As will be appreciated, the removable storage unit 718 includes a computer usable storage medium having stored therein computer software and/or data.

In alternative embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system may also include a communications interface 724. Communications interface 724 allows software and data to be transferred between the computer system and external devices. Examples of communications interface 724 may include a modem, a network interface (such as an Ethernet card), a communications port, a PCM-CIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel) 726. This channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 706 and/or secondary memory 712. Computer programs may also be received via communications interface 724. Such computer programs, when executed, enable the computer system to perform the features of the present invention as discussed herein. In particular, the computer programs, when executed, enable the processor 704 to perform the features of the computer system. Accordingly, such computer programs represent controllers of the computer system.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A method of carrying forward annotations to a data source when the data source is modified, each of the annotations being stored as an annotation record in an annotation data store, the method comprising the steps of:
retrieving a first data source version identifier based on a prior version of the data source;
generating a second data source version identifier based on a modified version of the data source, the modified version having at least one of content, form, and structure that is different from the prior version;
querying the annotation data store for the annotations that apply to the prior version of the data source; and
adding a new entry into the annotation record of at least one of the annotations that is returned by the query, the new entry in the annotation record including the second data source version identifier and point information indicating coordinates of at least one part of the modified version of the data source that the at least one annotation returned by the query is meant to annotate, so as to associate the at least one annotation with point information corresponding to at least two versions of the data source.

2. The method of claim 1, further comprising the step of filtering the annotations that are returned by the query so as to remove any annotation that is not relevant to the modified version of the data source.

3. The method of claim 2, wherein the filtering step includes the sub-step of determining whether each annotation that is returned by the query is relevant or not relevant to the modified version of the data source based on the point information stored in the annotation data store for that annotation.

4. The method of claim 1,
wherein the annotation record for each annotation includes an identifier list and the text of the annotation, and
the identifier list includes one or more list entries, each list entry comprising one data source version identifier and point information.

5. The method of claim 1, wherein the step of generating a second data source version identifier comprises the sub-steps of:
using a hashing algorithm to calculate a substantially unique hash value for the modified version of the data source; and
assigning the hash value as the second data source version identifier.

6. The method of claim 1, further comprising the step of calculating the point information or the modified version of the data source from the point information stored in the annotation data store for the prior version of the data source.

7. A computer program product for creating a new annotation for a data source, the computer program product comprising:
a storage medium readable by a processing circuit and storing instructions for execution by the processing circuit for performing a method comprising the steps of:
retrieving a first data source version identifier based on a prior version of the data source;
generating a second data source version identifier based on a modified version of the data source, the modified version having at least one of content, form, and structure that is different from the prior version;
querying the annotation data store for the annotations that apply to the prior version of the data source; and
adding a new entry into the annotation record of at least one of the annotations that is returned by the query, the new entry in the annotation record including the second data source version identifier and point information indicating coordinates of at least one part of the modified version of the data source that the at least one annotation returned by the query is meant to annotate, so as to associate the at least one annotation with point information corresponding to at least two versions of the data source.

8. The computer program product of claim 7, wherein the method further comprises the step of filtering the annotations that are returned by the query so as to remove any annotation that is not relevant to the modified version of the data source.

9. The computer program product of claim 7,
wherein the annotation record for each annotation includes an identifier list and the text of the annotation, and
the identifier list includes one or more list entries, each list entry comprising one data source version identifier and point information.

10. The computer program product of claim 7, wherein in the method the step of generating a second data source version identifier comprises the sub-steps of:
using a hashing algorithm to calculate a substantially unique hash value for the modified version of the data source; and
assigning the hash value as the second data source version identifier.

11. An annotation system in which annotations to a data source are carried forward when the data source is modified, each of the annotations being stored as an annotation record in an annotation data store, the method comprising the steps of:
a processor generating a first data source version identifier based on a prior version of the data source, and generating a second data source version identifier based on a modified version of the data source, the modified version having at least one of content, form, and structure that is different from the prior version;
a data store interface querying the annotation data store for the annotations that apply to the prior version of the data source, and adding a new entry into the annotation record of at least one of the annotations that is returned by the query, the new entry in the annotation record including the second data source version identifier and point information indicating coordinates of at least one part of the modified version of the data source that the at least one annotation is meant to annotate, so as to associate the at least one annotation with point information corresponding to at least two versions of the data source.

12. The annotation system of claim 11, further comprising the step of filtering the annotations that are returned by the query so as to remove any annotation that is not relevant to the modified version of the data source.

13. The method of claim 11,
wherein the annotation record for each annotation includes an identifier list and the text of the annotation, and
the identifier list includes one or more list entries, each list entry comprising one data source version identifier and point information.

* * * * *